United States Patent

Wacher

[15] 3,696,263

[45] *Oct. 3, 1972

[54] SOLID STATE LIGHT SOURCE WITH OPTICAL FILTER CONTAINING METAL DERIVATIVES OF TETRAPHENYLPORPHIN

[72] Inventor: Paul Wacher, Bayside, N.Y.

[73] Assignee: General Telephone & Electronics Laboratories Incorporated

[ * ] Notice: The portion of the term of this patent subsequent to Jan. 25, 1989, has been disclaimed.

[22] Filed: May 25, 1970

[21] Appl. No.: 40,940

[52] U.S. Cl................313/108 D, 252/300, 313/111, 313/112

[51] Int. Cl................H01j 5/08

[58] Field of Search....313/108 D, 111, 112; 252/300

[56] References Cited

UNITED STATES PATENTS

| | | | |
|---|---|---|---|
| 3,482,088 | 12/1969 | Ansley | 313/108 D X |
| 3,206,632 | 9/1965 | Rokosz | 252/300 X |
| 3,437,483 | 4/1969 | Nittel et al. | 252/300 X |
| 3,291,746 | 12/1966 | Donoian et al. | 252/300 |
| 2,850,505 | 9/1958 | Hein | 260/314 |

OTHER PUBLICATIONS

" Gallium Arsenide Light–Emitting Diode" By M. M. Roy et al., IBM Tech. Disclosure Bulletin, Vol. 7, No. 1, June 1964.

*Primary Examiner*—Roy Lake
*Assistant Examiner*—Palmer C. Demeo
*Attorney*—Irving M. Kriegsman

[57] ABSTRACT

A solid state light source adapted for viewing in an environment of ambient light. A solid state light-emitting device is provided for emitting a narrow band of visible light. An optical filter is disposed in the path between the light emitting device and the viewer. The filter is a polymeric matrix which contains at least one metal derivative of tetraphenylporphin. In a preferred embodiment of the invention the polymeric matrix is an acrylic ester polymer which overlays the transparent encapsulating surface of a red-emitting GaAsP diode.

12 Claims, 2 Drawing Figures

PATENTED OCT 3 1972 3,696,263

INVENTOR.
PAUL WACHER

BY M. Nowack

ATTORNEY.

SOLID STATE LIGHT SOURCE WITH OPTICAL FILTER CONTAINING METAL DERIVATIVES OF TETRAPHENYLPORPHIN

BACKGROUND OF THE INVENTION

This invention relates to light sources, and more particularly, to a solid state light source adapted for viewing in an environment of ambient light.

Solid state light-emitting devices, such as light-emitting diodes, are potential replacements for conventional indicator lamps in many display applications. The low power consumption and reliability of these devices have been cited as reasons for their expected widespread future use. It has been suggested, for example, that light-emitting diodes could be advantageously used in place of the small incandescent lamps now employed as key telephone indicators. An important consideration in such display applications is the contrast level provided by the light source with respect to background (which may be, for example, a telephone faceplate). In other words, when the light source is "on" it should be sufficiently visible against its background in, say, a well-lighted room. A problem arises in this respect in that ambient light striking the surface of a light-emitting device is reflected and/or scattered toward a viewer. The viewer sees the reflected light in addition to the light emitted by the device and this substantially reduces the contrast between the emitted light and the surrounding area.

There have been attempts to improve contrast in the above situation by providing either a neutral density filter or a polarizer in front of the device to minimize the amount of ambient light reflected toward the eye of the viewer. The main drawback in these efforts is the resultant degradation in the intensity of the light emitted by the device. It has been found that for solid state light emitters the gain in contrast is generally not worth the sacrifice in brightness encounterd when using polarizing or neutral density filters. Recently it has been proposed that a selective optical filter used in conjunction with a solid state light-emitter could give improved contrast without unduly sacrificing brightness. Most light emitting diodes emit visible radiation within a relatively narrow band of the visible spectrum. The idea, therefore, was to utilize a selective optical filter having a transmission characteristic which passes substantially only the wave lengths emitted by the source while absorbing other wavelengths. An example of a combination which has been proposed is a red-emitting gallium-arsenide-phosphide (GaAsP) diode in conjunction with a Corning red filter. The GaAsP diode emits red light having a peak emission at about 655 nm with a half-peak bandwidth generally less than about 30 nm. The Corning red filter is one of a group of commercially available selective optical filters. Typically, these filters are available in sheets or pieces having a substantial thickness of the order of 3mm. The utilization of such filters is limited by the form in which they are available. Thus, for example, a small GaAsP diode could, at considerable cost, be fitted with a cutout piece of filter material incorporated in a diode cap. It would be desirable, however, to have a filter material which could be more flexibly utilized and, for example, could be coated on the light-emitting diode itself. A further limitation of commercially available selective filters for use in conjunction with light-emitting diodes is that the filters were not particularly formulated to spectrally match with these devices, and, as a result, do not offer optimum spectral fit. Accordingly, it is an object of the present invention to provide a light source which includes a solid-state light emitting device and a spectrally fitted selective optical filter having desirable physical properties.

BRIEF SUMMARY OF THE INVENTION

The present invention is directed to a solid state light source adapted for viewing in an environment of ambient light. A solid state light-emitting device is provided for emitting a narrow band of visible wavelengths. An optical filter is disposed in the path between the light-emitting device and the viewer. The optical filter comprises a polymeric matrix which contains at least one metal derivative of tetraphenylporphin (TPP). The optical filter substantially absorbs incident visible light which is outside the spectral band emitted by the solid state device.

In a preferred embodiment of the invention the polymeric matrix is an acrylic ester polymer which overlays the transparent encapsulating surface of a red-emitting solid-state device. In this embodiment the plastic matrix contains platinum derivative of TPP, tin dichloride derivative of TPP and manganese chloride derivative of TPP. Further features and advantages of the invention will become more readily apparent from the following detailed description when taken in conjunction with the accompanying drawings.

DESCRIPTION OF THE PREFERRED EMBODIMENTS

Figure 1:
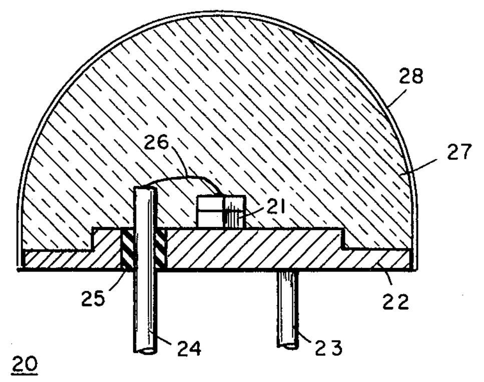
FIG. 1 is a cross-sectional view of a solid state light source in accordance with the invention.

Referring now to FIG. 1 there is shown a solid state light source 20 in accordance with the invention. A light emitting diode 21, such as a red-emitting GaAsP diode, is mounted on a metal header 22. Input pin 23 is coupled to the header 22 and another input pin 24 extends through the header and is insulated therefrom by insulating ring 25. The end of pin 24 is coupled to the diode 21 by conductive whisker 26. A voltage applied across the input pins energizes the diode 21 whereupon it emits red light. A solid transparent epoxy dome 27 encapsulates the header and diode assembly and protects the diode and its delicate connections. As is known in the art, the dome 27 also serves as a lens and acts to focus the light emitted from the diode. Overlying the rounded dome is a layer 28 of selective optical filter material. Layer 28 includes a polymeric matrix which contains metal derivatives of tetraphenylporphin (TPP). (A family of optical filters which comprise plastic matrices containing metal derivatives of TPP is disclosed in my copending U.S. Application Ser. No. 41,133, now U.S. Pat. No. 3,631,081 filed of even date herewith and assigned to applicant's assignee). Said copending application disclosing the use of metallic derivatives of tetraphenylporphin having the following structure:

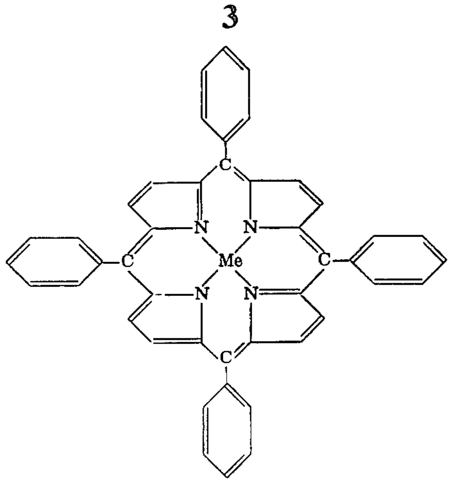

in a polymeric matrix, particularly an acrylic ester polymer matrix, as optical filters.

Figure 2:
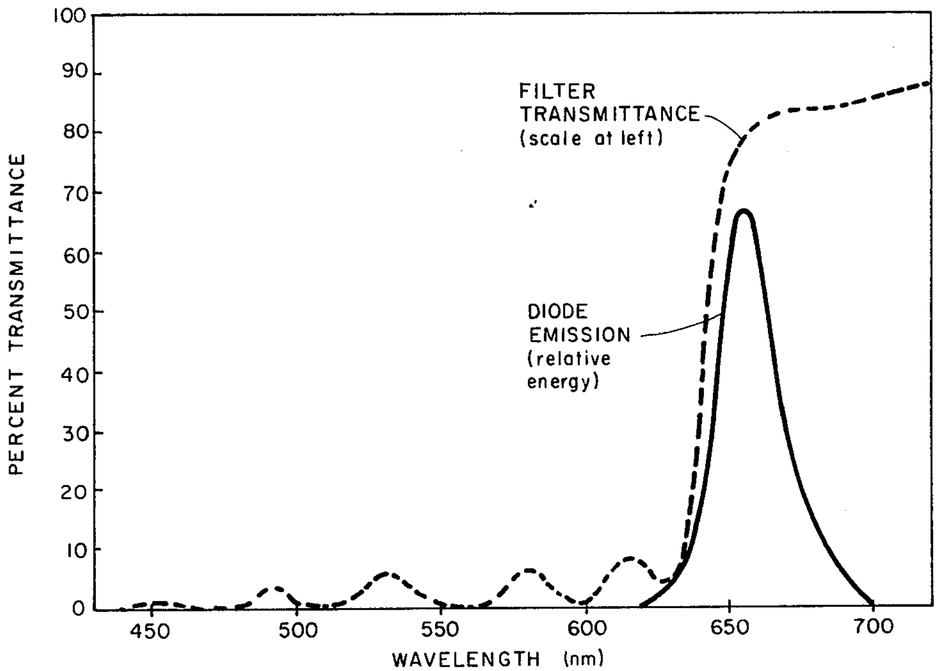
FIG. 2 is a graphical representation of diode emission and filter transmittance for a device in accordance with the invention.

FIG. 2 shows the spectral emission characteristics of a GaAsP diode. The diode emission peaks at about 655 nm and is seen to have a relatively narrow bandwidth which is less than about 30 nm at its half-peak points. The selective optical filter layer 28 utilized in conjunction with this diode consists of an acrylic ester polymer which contains platinum derivative of TPP (PtTPP), tin chloride derivative of TPP ($SnCl_2TPP$) and manganese chloride derivative of TPP (MnClTPP). The transmission spectrum of this filter layer is shown in FIG. 2 and the match with the diode emission characteristic is seen to be close. The filter strongly absorbs wave-lengths shorter than the diode emission but does not substantially absorb wavelengths longer than the diode's emission. This mode of filtration is effective, however, since the human eye is virtually insensitive to ambient wavelengths above about 700 nm.

The filter layer 28 is made as follows: Three solutions in benzene are prepared.

a. 0.5 mg PtTPP/ml. benzene
b. 1.0 mg $SnCl_2$/ml. benzene
c. 1.0 mg MnCl/ml. benzene These solutions are each added to a 40 percent solution of acrylic ester polymer in ethelene glycol monomethyl ether (E.G.M.E.). Additional amounts of E.G.M.E. are added to each solution to give three solutions which consists of the following:

| | | Parts by Weight |
|---|---|---|
| A. | PtTPP in benzene | 2.5 |
| | 40% polymer in E.G.M.E. | 1.0 |
| | E.G.M.E. | 1.0 |
| B. | $SnCl_2TPP$ in benzene | 1.5 |
| | 40% polymer in E.G.M.E. | 1.0 |
| | E.G.M.E. | 2.0 |
| C. | MnClTPP in benzene | 1.5 |
| | 40% polymer in E.G.M.E. | 1.0 |
| | E.G.M.E. | 2.0 |

The solutions are sprayed on the epoxy dome and then heated in air at 145° C to remove the solvents and produce a dry acrylic polymer film. A coating of ultraviolet screening agent such as a substituted benzatriazole can be applied to the outer surface of layer 28 to protect the filter layer from the deleterious effects of ambient ultraviolet (UV) light. UV light has been found to have a degrading effect on the optical properties of the material of layer 28.

In another embodiment of the invention, a green-emitting gallium phosphide (GaP) diode is utilized in the structure of FIG. 1 to form a greenlight source. This diode has a relatively narrow-band emission peaking at about 550 nm. The filter layer in this embodiment comprises an acrylic ester polymer which contains PtTPP, MnClTPP, nickel derivative of TPP (NiTPP), and a blue dye such as "solvent blue 48". The filter of this embodiment strongly absorbs ambient wave-lengths which are both shorter and longer than the band of diode emission wavelengths (as is necessary since the eye is quite sensitive to both these types of ambient wavelengths). However, the filter transmission percentage within the diode emission band is substantially smaller for the green light source than for the red light source.

It will be appreciated that with the present invention a solid-state light source adapted for viewing in an ambient environment is achieved with a single compact structure. Filter coatings which spectrally match a particular diode emission can be coated on an encapsulated diode thereby eliminating the need for separate filter structures.

What is claimed is:

1. A solid state light source adapted for viewing in an environment of ambient light comprising:
   a. a solid-state light-emitting device for emitting a narrow band of visible wavelengths, and
   b. an optical filter disposed in the path between said light-emitting device and a viewer, said filter comprising a polymeric matrix which contains at least one metal derivative of a tetraphenylporphin having the formula:

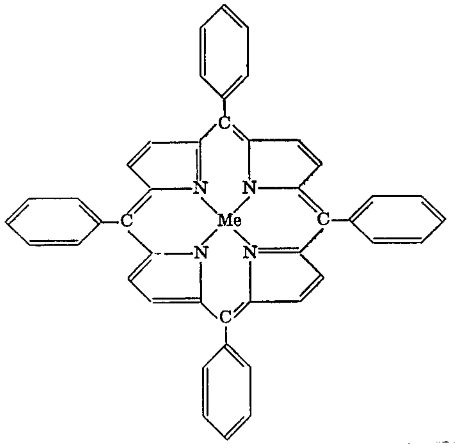

wherein Me represents the metallic component.

2. A solid state light source as defined by claim 1 wherein said polymeric matrix is an acrylic ester polymer.

3. A solid state light source as defined by claim 1 wherein said polymeric matrix is an acrylic ester polymer, said device is red-emitting and said acrylic ester polymer contains the platinum, tin dichloride, and manganese chloride derivatives of the tetraphenylporphin defined in claim 1.

4. A solid state light source as defined by claim 3 wherein said red-emitting device is a GaAsP diode.

5. A solid state light source as defined by claim 1 wherein said polymeric matrix is an acrylic ester polymer, said device is green-emitting and said acrylic ester polymer contains the platinum, manganese chloride and nickel derivatives of the tetraphenylporphin defined in claim 1 and a blue dye.

6. A solid state light source as defined by claim 5 wherein said green-emitting device is a GaP diode.

7. A solid state light source adapted for viewing in an environment of ambient light comprising:

a. a light-emitting diode for emitting a narrow band of visible wavelengths, b. transparent encapsulating means covering said diode, and c. an optical filter layer overlaying said encapsulating means, said layer comprising a polymeric matrix which contains at least one metal derivative of a tetraphenylporphin, said metal derivative having the formula:

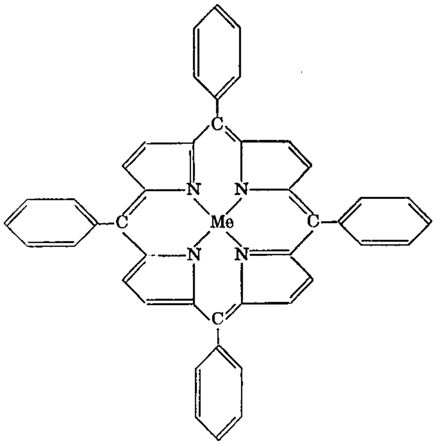

wherein Me represents the metallic component.

8. A solid state light source as defined by claim 7 wherein said polymeric matrix is an acrylic ester polymer, 9. A solid state light source as defined by claim 7 wherein said polymeric matrix is an acrylic ester polymer, said diode is red-emitting and said acrylic ester polymer contains the platinum, tin dichloride and manganese chloride derivatives of the tetraphenylporphin defined in claim 7.

10. A solid state light source as defined by claim 9 additionally comprising a layer of ultraviolet screening material overlaying said filter layer.

11. A solid state light source as defined by claim 10 wherein said red-emitting diode is a GaAsP diode.

12. A solid state light source as defined by claim 7 wherein said polymeric matrix is an acrylic ester polymer, said diode is green-emitting and said acrylic ester polymer contains the platinum, manganese chloride and nickel derivatives of the tetraphenylporphin defined in claim 7 and a blue dye.

* * * * *